3,005,517
ACRYLONITRILE RECOVERY PROCESS
James D. Idol, Jr., Shaker Heights, Arthur J. Tiffan, Akron, and Evelyn J. Beals, Cleveland, Ohio, assignors to The Standard Oil Company, Cleveland, Ohio, a corporation of Ohio
No Drawing. Filed Aug. 14, 1959, Ser. No. 833,670
3 Claims. (Cl. 183—115)

The present invention relates to the recovery of acrylonitrile. More particularly, the present invention is concerned with the recovery of acrylonitrile in a process for the production of same.

In co-pending application Serial No. 685,352 of James D. Idol, Jr., now U.S. Patent 2,904,580, filed September 20, 1957, which has been assigned to our assignee, a process is described for the manufacture of acrylonitrile which comprises the vapor phase catalytic reaction of propylene, ammonia, and oxygen. In the latter process a part of the ammonia which is introduced as feed to the reaction is unreacted and, consequently, the effluent gases from the reaction zone contain in addition to acrylonitrile a small but nevertheless appreciable amount of ammonia as well as other unreacted feed materials such as propylene, oxygen, nitrogen, and propane. The reaction effluent will also usually contain other reaction products such as hydrogen cyanide, acetonitrile, etc.

Acrylonitrile, which is the principal product of the aforesaid process, may be recovered from the reactor effluent gases by scrubbing the hot gases with a suitable solvent such as water in an absorber. Because of the solubility of ammonia in most solvents, the rich solvent leaving the absorber will contain practically all of the unreacted ammonia which is present in the effluent gas as well as the acrylonitrile. The presence of the latter two materials in the rich solvent creates a serious problem as it is well known that ammonia will react with the acrylonitrile to give various by-products which detract from the overall yield of acrylonitrile. Such side reactions will, of course, have an adverse effect on the economics of the process. It is believed that the principal by-products are those resulting from the direct reaction of ammonia and acrylonitrile; and, since one, two, or all of the hydrogen atoms of the ammonia may be substituted by a β-cyanoethyl group, the following by-products may result:

H$_2$NCH$_2$CH$_2$CN—β-aminopropionitrile
HN(CH$_2$CH$_2$CN)$_2$—β,β'-iminodipropionitrile
N(CH$_2$CH$_2$CN)$_3$—β,β',β''-nitrilotripropionitrile It is apparent therefore that one mol of ammonia may be responsible for the loss of as much as three mols of acrylonitrile from the product.

It is the object of the present invention to prevent the aforesaid reactions of ammonia and acrylonitrile in the operation of the absorber which has been referred to above.

While ammonia and acrylonitrile will react to some extent over a broad range of temperature conditions, we have discovered, surprisingly, that at certain low temperature conditions an induction period exists for the reaction of acrylonitrile and ammonia, and during this low temperature induction period no significant amount of reaction takes place. The present invention makes use of this surprising discovery in a process employing the aforesaid critical temperature conditions whereby the reaction of acrylonitrile and ammonia is avoided with a consequent improvement in the yield of acrylonitrile.

In brief, the process of our invention involves the recovery of acrylonitrile from the hot effluent gas obtained in the reaction of the process described and claimed in co-pending application Serial No. 685,352 referred to above. This process comprises the steps of feeding the hot effluent gas, partially cooled if desired but at a temperature of not less than 100° F., to an absorber and absorbing the effluent gases from the reaction with a solvent at a temperature below about 75° F. and subsequently removing acrylonitrile from the rich solvent before any appreciable reaction has occurred between the acrylonitrile and ammonia in said solvent. The separation of acrylonitrile from the rich solvent is accomplished by conventional separation techniques known to those skilled in the art such as by extractive distillation and azeotropic distillation. Likewise, the absorption step of the process is a conventional technique which is not critical except for the aforesaid temperature condition. For example, the scrubbing operation may be conveniently carried out in a vertical tower. If desired, this tower may contain packing, bubble cap trays, or other conventional gas-liquid contacting means. The reactor effluent gases are ordinarily introduced at the bottom of the tower and they will flow upwardly against a descending stream of lean solvent which is usually admitted near the top of the tower by spraying or similar means. The temperature in the tower is controlled by varying the amount and temperature of the solvent admitted to the top of the tower. The lighter components of the reaction effluent gas such as propylene, nitrogen, etc. will pass through the tower unabsorbed and they are eventually discharged from the top of the tower. The rich solvent is continuously removed from the bottom of the absorption tower where it will contain the desired ingredients of the reactor effluent. Various conventional equipment may be employed in connection with the absorption tower; as for example, a control system which would regulate the amount of lean solvent admitted to the tower in response to the temperature of the rich solvent which is leaving the bottom of the tower.

In the preferred embodiment of our invention, the hot reactor effluent gases having the following approximate composition:

| Component: | Mol percent |
|---|---|
| Acrylonitrile | 3.98 |
| Ammonia | 1.56 |
| Propylene | 2.10 |
| Propane | 0.91 |
| Acetonitrile | 0.79 |
| Hydrogen cyanide | 0.73 |
| Oxygen | 1.91 |
| Nitrogen | 73.50 |
| Carbon monoxide | 2.24 |
| Carbon dioxide | 3.95 |

(exit) from the reactor at a temperature of approximately 850° F. and is preliminarily cooled by spraying a jet of water into the stream so that the temperature of the gaseous mixture is approximately 100° F. when it enters the absorbing tower.

86,000 pounds per hour are introduced into an absorbing tower near the bottom thereof at a temperature of approximately 100° F. Water, which is a preferred solvent, is introduced at the top of the tower at a temperature of approximately 55° F. The amount of water introduced at this temperature is approximately 150,000 pounds per hour and at any event is regulated so that the temperature of the water which is withdrawn at the bottom of the tower is approximately 60° F. The time during which the ammonia and acrylonitrile are in solution in the solvent within the absorption tower before withdrawal is approximately 30 minutes.

The solution which is withdrawn from the bottom of the absorption tower is then transferred to an extractive distillation tower where the acrylonitrile is separated from the rich solvent by extractive distillation, preferably using water as an extractive agent, but this step forms no part of the present invention.

In order to illustrate the advantages of this invention a number of samples were prepared in stoppered Pyrex test tubes. These samples all contained an aqueous solution comprising 4% acrylonitrile and 0.24% ammonia and they were placed in a constant temperature bath. Three different temperatures between 20° C. and 60° C. were employed in the tests. The amount of acrylonitrile remaining in the samples was measured by analyzing the solution at regular intervals with a chromatograph. When considering the results obtained, it is important to note that all of the samples contained the same amount of acrylonitrile and ammonia at the outset of the test. The degree of reaction between acrylonitrile and ammonia was determined by measuring the acrylonitrile content after a period of time, the difference between the original acrylonitrile content and the acrylonitrile content at the time of measurement reflecting the amount of acrylonitrile reacted. The results are set forth in the following table:

| Sample | Temp. | | Time in Hours | | | | | | |
|---|---|---|---|---|---|---|---|---|---|
| | °F. | °C. | 0 | 1 | 2 | 3 | 4 | 5 | 6 |
| | | | Acrylonitrile Content | | | | | | |
| A | 68 | 20 | 4.0 | 4.0 | 4.0 | 4.0 | 3.9 | 3.8 | 3.8 |
| B | 104 | 44 | 4.0 | 3.5 | 3.2 | 3.0 | 2.8 | 2.7 | 2.7 |
| C | 140 | 60 | 4.0 | 2.4 | 2.2 | 2.1 | 1.9 | 1.9 | 1.8 |

It is apparent from this data that the sample which was maintained at a temperature of 20° C. did not undergo any appreciable reaction during the first three hours of the test, whereas the remaining samples underwent some reaction right from the outset. Since the three-hour induction period obtained at 20° C. is entirely adequate insofar as a continuous chemical process is concerned the data demonstrates that acrylonitrile and ammonia will not undergo any appreciable reaction during the absorption operation if the critical temperature limitations of this invention are observed. Accordingly, recovery of substantially all of the acrylonitrile from the reaction effluent gas is made possible by means of this invention.

It will be obvious to those skilled in the art that various modifications of the process described in this application may be made without departing from the spirit or scope of this invention. Accordingly, this application for Letters Patent is intended to cover all such modifications as would reasonably fall within the scope of the appended claims.

We claim:

1. A process for the recovery of acrylonitrile from a gaseous mixture resulting from the catalytic vapor phase reaction of ammonia, propylene, and oxygen comprising acrylonitrile and ammonia which comprises the step of absorbing said acrylonitrile and ammonia in a solvent while maintaining the temperature of said solvent during said absorption step at a temperature below about 75° F. whereby any reaction between said acrylonitrile and ammonia absorbed in said solvent is substantially precluded.

2. A process for the recovery of acrylonitrile from a gaseous mixture resulting from the catalytic vapor phase reaction of ammonia, propylene and oxygen comprising acrylonitrile and ammonia which comprises the step of absorbing said acrylonitrile and ammonia in water while maintaining the temperature of said water during said absorption step at a temperature below about 75° F. whereby any reaction between the acrylonitrile and ammonia absorbed in said water is substantially precluded.

3. A process for the recovery of acrylonitrile from a gaseous mixture resulting from the catalytic vapor phase reaction of ammonia, propylene, and oxygen comprising acrylonitrile and ammonia in a counter-current absorption zone which comprises the step of absorbing said acrylonitrile and ammonia in water during a period of less than three hours while maintaining the temperature of said water during said absorption step at a temperature of about 68° F. whereby any reaction between said acrylonitrile and ammonia in said water is substantially precluded.

References Cited in the file of this patent

UNITED STATES PATENTS

| 2,444,175 | Teter et al. | June 29, 1948 |
| 2,468,363 | Frejacques | Apr. 26, 1949 |
| 2,684,979 | Wenner | July 27, 1954 |

OTHER REFERENCES

"General College Chemistry," by Babor and Lehrman, second edition, Crowell Co., New York, 1946, page 68.